United States Patent [19]

Seamster, Jr.

[11] Patent Number: 4,777,688

[45] Date of Patent: Oct. 18, 1988

[54] VEHICLE WASHING MACHINE

[76] Inventor: Silas Seamster, Jr., Rte. 1, Box 1641, Ringgold, Va. 24586

[21] Appl. No.: 78,812

[22] Filed: Jul. 28, 1987

[51] Int. Cl.⁴ .............................................. B60S 3/06
[52] U.S. Cl. .............................. 15/53 A; 15/DIG. 2
[58] Field of Search .............. 15/DIG. 2, 53 R, 53 A, 15/53 AB, 53 B, 97 B; 362/29; 340/51

[56] References Cited

U.S. PATENT DOCUMENTS

| | | | |
|---|---|---|---|
| 3,035,293 | 5/1962 | Larson | 15/53 AB |
| 3,816,869 | 6/1974 | Ennis | 15/53 AB |
| 3,964,015 | 6/1976 | Collins | 362/29 X |
| 4,341,488 | 7/1982 | Ryan | 340/51 X |
| 4,665,378 | 5/1987 | Heckethorn | 340/51 |

*Primary Examiner*—Edward L. Roberts
*Attorney, Agent, or Firm*—Rhodes, Coats & Bennett

[57] ABSTRACT

This invention is a machine for washing vehicles. A plurality of horizontal and vertical rotating brushes are provided to move over a car's surface to scrub it. Horizontal top brushes are mounted on pivoting brush arms which are counterbalanced by springs to assure relatively constant brush pressure on a vehicle surface regardless of the brush arm's orientation. Additionally, generally vertical side brushes are stacked in tandem on each side of the machine to wash the sides of a vehicle. These tandem side brushes are supported by inwardly canted shafts enabling the brushes to freely fall against the sides of a vehicle. Each side brush is independently driven at its outermost end to allow independent control of each brush. Means for guiding a vehicle into the wash bay is also provided. This is preferably a vertical water beam disposed within the wash bay by which a driver can accurately position a vehicle for washing.

7 Claims, 6 Drawing Sheets

VEHICLE WASHING MACHINE

FIELD OF INVENTION

This invention relates to cleaning and more particularly to an improved machine for washing the exterior of vehicles.

BACKGROUND OF THE INVENTION

Automobiles and similar vehicles are often the most expensive personal property a person owns. For this reason pride is usually taken in their cleanliness. Many people, however, do not have the time and/or place to wash a car, and the great increase in labor cost over recent years has made it prohibitively expensive to hire someone to wash a vehicle.

In repsonse to these problems, various types of automatic and semiautomatic vehicle washing systems have been developed to facilitate fast and inexpensive car washing. One type of system uses high pressure water jets deployed around a washing bay to alternately spray the vehicle with soapy water and rinse water. This system may be adequate for a vehicle with loose dirt, but heavy road grime is not, however, adequately cleaned. The results of this sytem therefore leave much to be desired, particularly in areas shielded from direct water jet action.

A second primary method utilizes a plurality of long bristle brushes to scrub away dirt, highway grime, and other hard to loosen materials. These brushes are disposed in various positions around a vehicle. Historically, side or vertically disposed brushes have been either single or double brushes located on each side of the vehicle wash bay. Single side brushes are usually mounted on a vertical shaft and have bristles extending from a point near the ground to the highest point of any vehicle that the machine is adapted to clean. This arrangement is often further modified by the use of multiple side brushes. The use of two vertical brushes on each side allows the upper brush to be cut off when washing the front and rear portions of the vehicle. To accomplish this purpose the tandem side brushes have invariably been driven by one or more motors mounted above the side brushes. Usually, the bottom brush is driven by a shaft of other means passing through a hollow upper brush assembly. This provides an indirect drive system which is cumbersome, difficult to repair, subject to frequent breakdowns, and more costly to construct and operate than a direct drive system.

Horizontally disposed, overhead pivoting brushes for washing the front, rear, and top of the vehicle have long been used in conjunction with side brushes. These pivoting horizontal brushes may be hydraulically or pneumatically positioned. Alternatively, they are in some systems counterbalanced by weights suspended from the brush arm and allowed to pivot freely during the wash sequence. The brushes thus move as they encounter the vehicle surface.

It has been nearly impossible to achieve accurate control of hydraulic or pneumatically operated overhead brushes. This has resulted in vehicle damage or unsatisfactory wash results. Moreover, in the counterbalance system, the amount of pressure required to move the brush when the brush arms hang vertically is much less than the pressure required when the brush arms swing upwardly. Only slight pressure is required to move the horizontal brush when its brush arms are nearly vertical. This characteristic greatly reduces the cleaning ability of such brushes against the front and rear of a vehicle. On the other hand, increased pressure is requird to move the brushes as the support arms pivot upwardly. This causes excessive cleaning pressure which may damage the finish on the vehicle and even cause structural damage.

The problem thus encountered by pivotable brush arms is that the total moment varies greatly as the brush arm pivots from its lowermost position to its uppermost position. Prior art discloses several attempts to normalize the variations in this moment. Some designs use multiple counterweights as shown in U.S. Pat. No. 4,470,167 to Bivens. Other devices, like that shown in U.S. Pat. No. 3,816,869 to Ennis, use a movable counterweight. All of these devices have a drawback, however, in that the heavy weights required create high load on the brush arm and frame.

A further problem found in vehicle washes of all types is the difficulty in properly centering the vehicle within the wash bay before beginning the washing process. One method uses guide rails to lead the vehicle into the wash bay. These guide rails must be spaced widely enough to accept various tire widths and therefore allow several inches latitude to vehicles with narrower tires. Since vehicle width also varies drastically, these rails, which are usually fixed, must be set to accommodate a vehicle of average width. This is at best a compromise and necessarily allows lateral variation in vehicle placement.

Other car wash systems simply require the vehicle drive to center the vehicle in the machine without the aid of any helpful devices. A driver must aim for a small treadle switch on the floor of the wash bay which must be activated to begin the wash sequence. Few drivers, however, are capable of bringing their car to the enter of the wash bay without outside aid. The considerble lateral varation allowed by either of these centering methods can cause problems in the washing process and will produce an uneven wash.

SUMMARY OF THE OBJECTS OF THE INVENTION

After much research and study into the above mentioned problems, the present invention has been developed to provide an improved vehicle washing machine using a plurality of brushes to clean the surface of a vehicle.

Horizontally disposed top brushes are suspended from pivoted support arms. Counterbalance springs enable the brushes to exert nearly constant, predetermined pressure on a vehicle surface. The brushes can thus be set for optimum cleaning pressure while preventing excessive brush pressure which can damage the vehicle finish.

Side brushes are mounted on vertical shafts disposed on each side of the wash bay. Each shaft supports an upper and lower brush which is independently driven by separate drive motors mounted at the top and bottom of the vertical shaft. This arrangement allows each brush to be independently controlled.

A water beam projects downwardly for use as an indicator whereby a driver can determine whether the vehicle is properly aligned within the wash bay. This eliminates the need for guide rails or guesswork to center the vehicle for a good wash.

In view of the above description it is an object of the present invention to provide a vehicle washing machine utilizing horizontal top brushes which are spring counterbalanced.

Another object of the present invention is to provide, in a vehicle washing machine, horizontally disposed brushes which are spring counterbalanced in combination with tension equalizing means.

Another object of the present invention is to provide, in a vehicle washing machine, a tension equalizing means for pivotal horizontal brushes in the form of a trolley bracket mounted thereon.

Another object of the present invention is to provide, in a vehicle washing machine, tandem side brushes which are independently controlled and separately driven by direct drive.

Another object of the present invention is to provide, in a vehicle washing machine, a visual guide means for centering a vehicle within a vehicle cleaning system.

Another object of the present invention is to provide a water beam for use in guiding a vehicle into the center of a vehicle cleaning system.

Other objects and advantages of the present invention will become apparent and obvious from a study of the following description and the accompanying drawings which are merely illustrative of such invention.

DETAILED DESCRIPTION OF THE INVENTION

Figure 1:
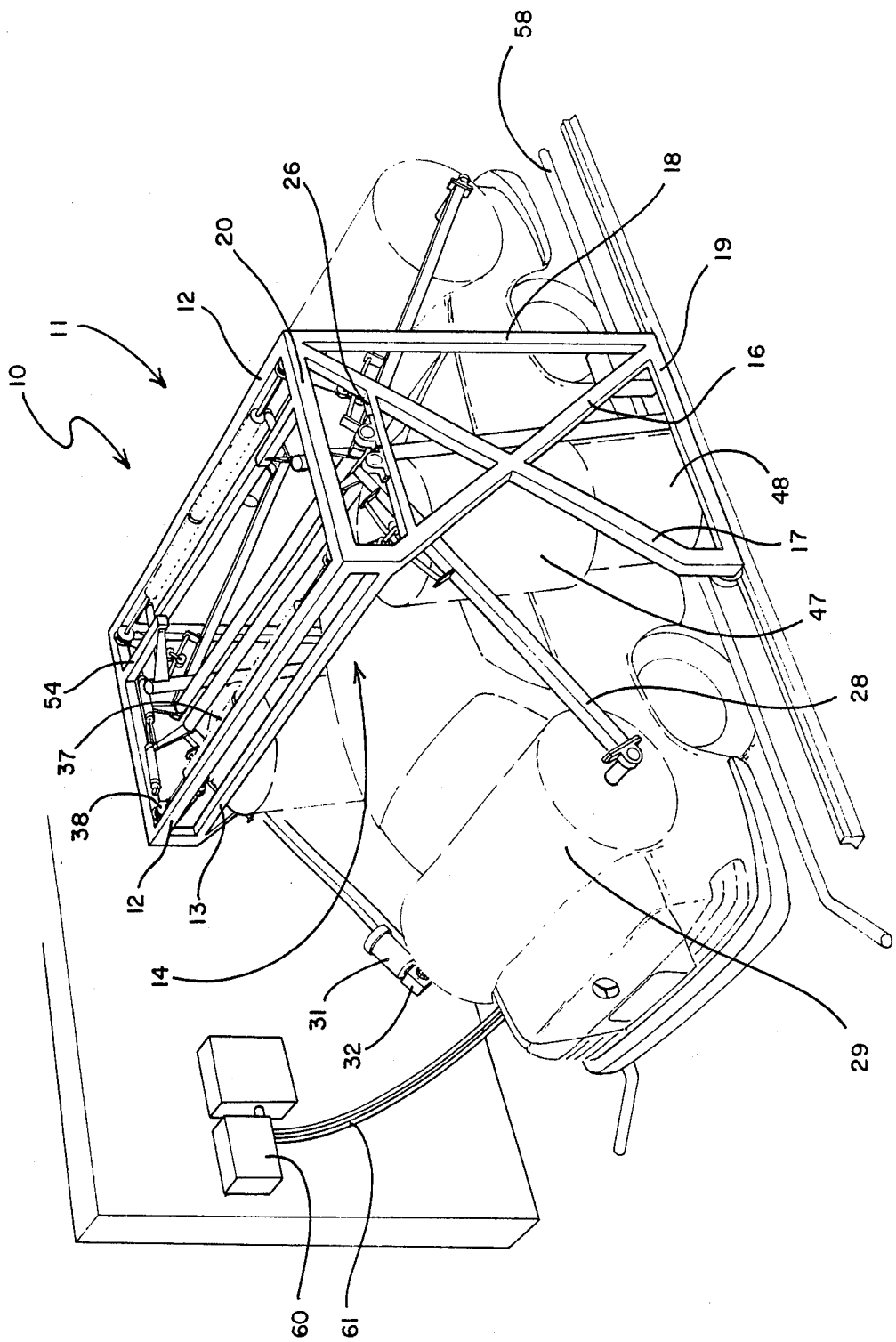
FIG. 1 is a perspective view of the vehicle washing machine showing the machine in operation with a vehicle being washed in the wash bay.
Figure 2:
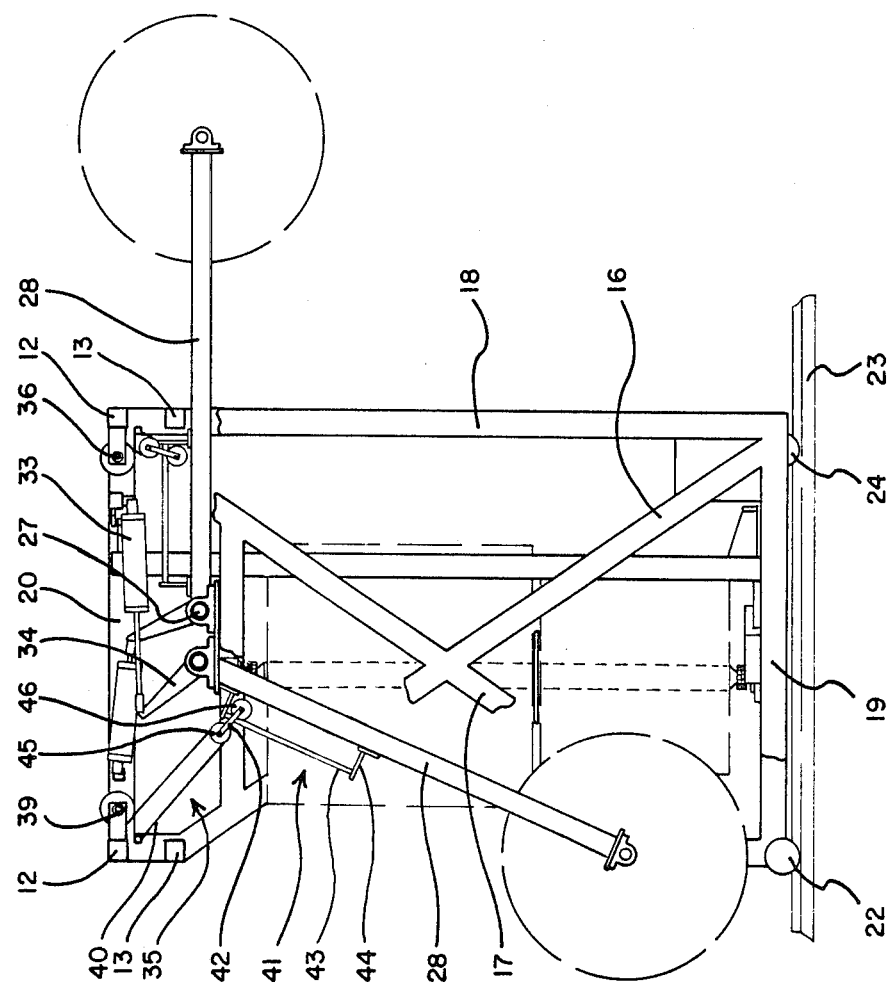
FIG. 2 is a side view of the vehicle washing machine with one top brush lifted to its highest position and the other brush freely hanging downward.
Figure 3:
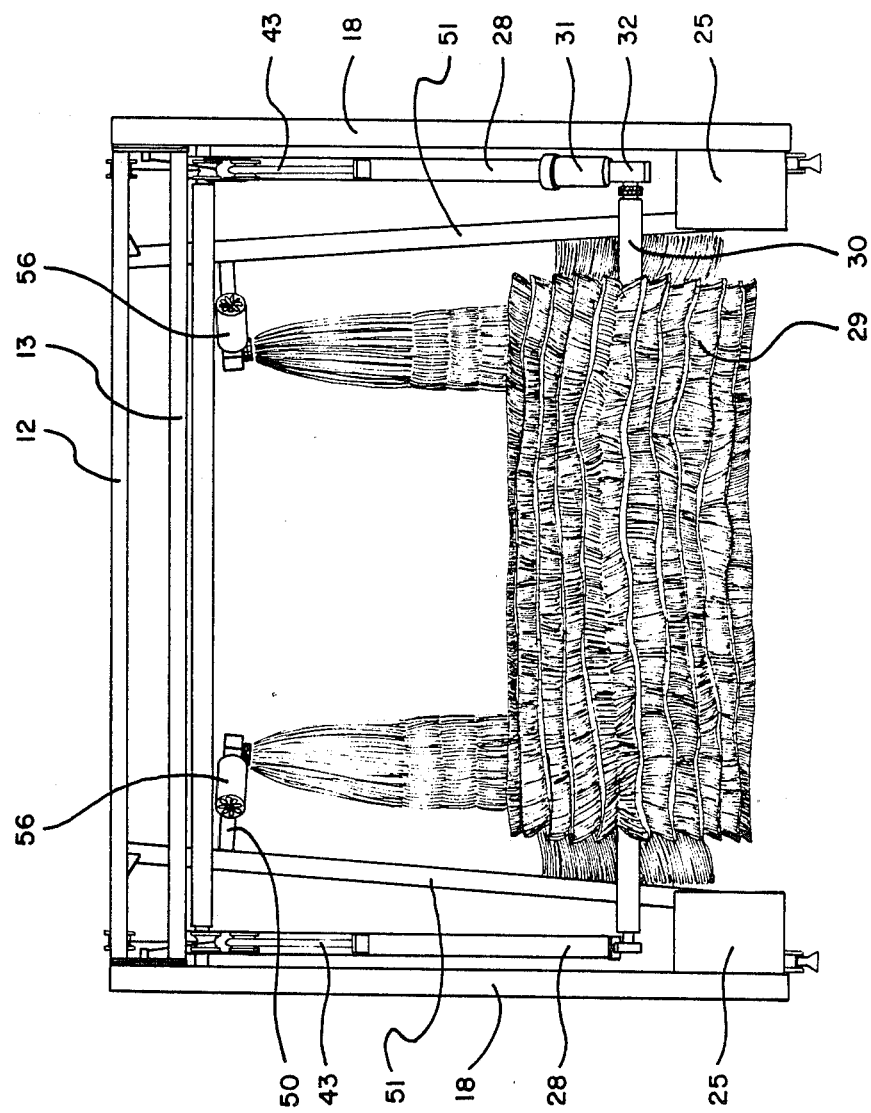
FIG. 3 is an end view illustrating the machine in operation with both top brushes rotating with the brush arms hanging downward, and where the lower side brushes are operating and the upper side brushes are stopped.
Figure 5:
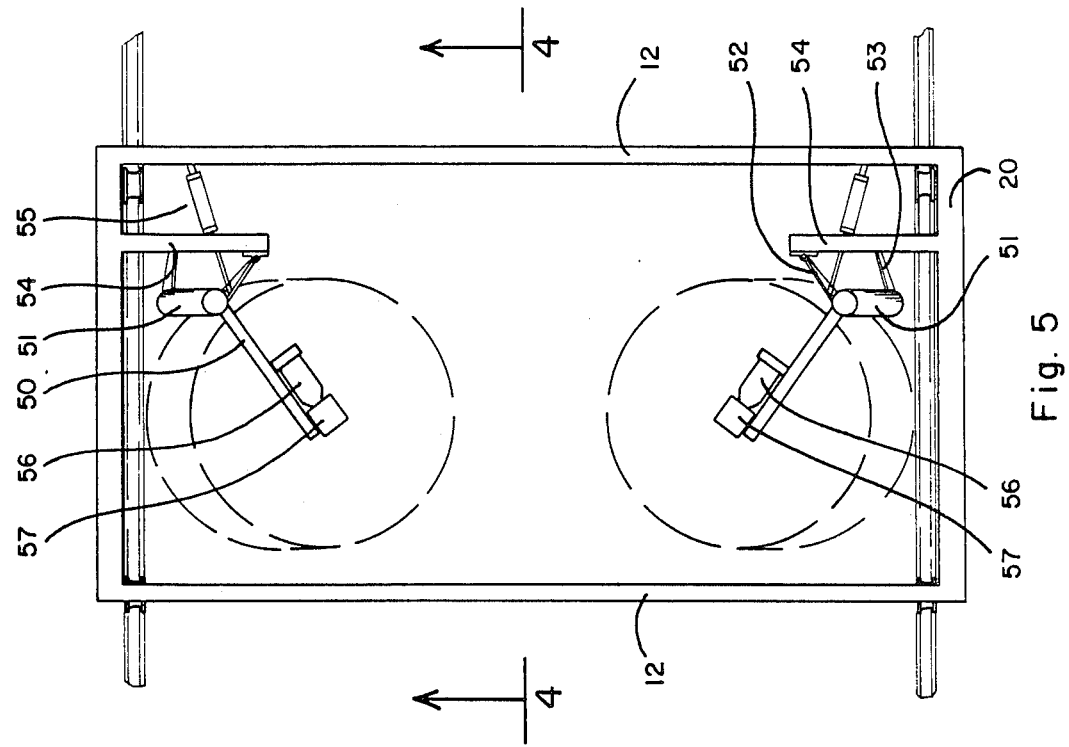
FIG. 5 is a partial top view illustrating the vehicle washing machine with the side brushes in operation.
Figure 4:
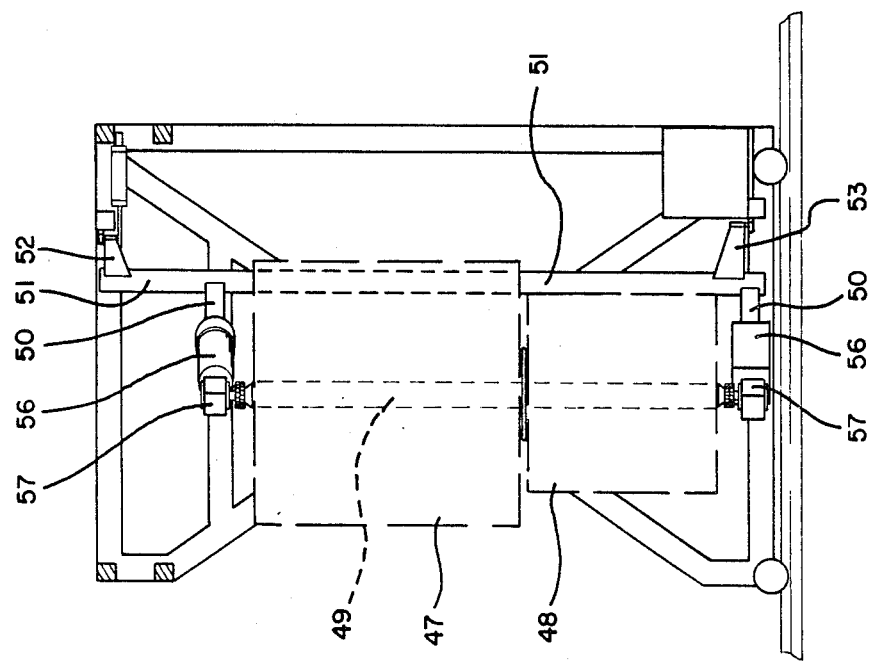
FIG. 4 is a partial side view omitting the top brushes for clarity to illustrate the side brush operation.

Referring now to the drawings, the vehicle washing machine of the present invention is shown as indicated generally at the numeral 10. Viewed in more detail, vehicle washing machine 10 includes frame 11 which supports the operative parts of the invention and partially surrounds a vehicle when driven underneath. Frame 11 consists of two side frame assemblies disposed on opposite sides of a vehicle wash area 14.

Side frame assemblies are each comprised of a top membe 20, a bottom member 19, two diagonal members 16 and 17, and an intermediate brush mounting member 26. Two pairs of lateral members, 12 and 13 extend laterally above the vehicle wash area 14 and connect the side frame assemblies.

Frame 11 rests on wheels 22 which are connected to bottom member 19 and drive wheels 24. A drive motor housing 25 is secured to frame 11 and houses a motor and gear box (not shown). Drive wheels 24 are secured to said gear box by means of a tuper-lock bushing without chain couplings or external bearings.

Bearings 27 are mounted on the intermediate brush mounting members 26 near the center of the side frame assemblies and above the normal height of a vehicle. Two pairs of brush arms 28 are pivotally connected to frame 11 by means of bearings 27. Brushes 29 are mounted on horizontally disposed axle shafts 30 carried between the free ends of said paired brush arms 28. Brush arms 28 extend generally outwardly from frame 11 and pivot in a vertical plane. The brushes 29 are thus urged into contact with the vehicle by the force of gravity and freely ride over the upper surfaces of the vehicle as frame 11 moves along its tracks 23.

A drive motor 31 mounted at the end of each brush arm 28 directly drives gear box 32 to turn brush axle shafts 30. This arrangement rotates horizontal brushes 29 to clean the top surface of the vehicle within wash bay 14. Furthermore, the pivotable mounting of brush arms 28 allows the horizontal brushes to be displaced by contact with a vehicle surface. This feature enables the brush to wash a variety of vehicles of different shapes.

Figure 6D:
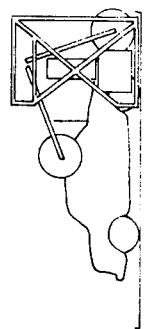
FIG. 6 is a set of drawings depicting the movements of the machine throughout an entire wash sequence.
Figure 6H:
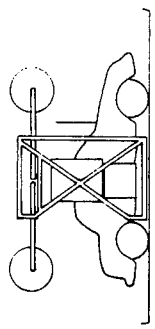
Figure 6C:
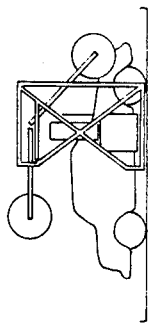

When the machine is not in use, brush arms 28 are lifted to a horizontal position by pneumatic cylinders 33. Pneumatic cylinders 33 are mounted on top side members 20 and act on lifting arms 34 which extend from the bearing end of each brush arm 28. This arrangement moves the horizontal brushes 29 to a clear position above the highest point of the vehicle whereby a vehicle can enter the wash bay to be properly positioned for washing as shown in FIG. 6a. When the vehicle washing machine is actuated, pneumatic cylinders 33 disengage to allow horizontal brushes 29 to fall against the vehicle surface under gravitational forces.

Wash brushes 29 are counterbalanced by spring assembly 35 so that the brushes exerts a relatively uniform pressure against a vehicle surface regardless of the orientation of brush arms 28. Counterbalance assembly 35 consists of a spring shaft 36, torsion spring 37, and has a reel 38 at each end. The ends of spring shaft 36 are supported by bearings 37 mounted near the ends of top side members 20. This arrangement enables counterbalance spring assembly 35 to rotate.

On each side of the machine, a cable 40 is wound about reel 38 and used to transmit a force produced by torsion spring 37 to brush arms 28. Cable 40 passes through trolley assembly 41, which is mounted for movement along said brush arms 28, and then fixedly secured at a point near the top corner of frame 11. This arrangement provides a 2:1 mechanical advantage by virtue of cable 40 passing through moving trolley assembly 41. The tension force thus transmitted to brush arms 28 opposes the downward motion of brush arms 28 and thus counterbalances the force of gravity.

Trolley assembly 41 consists of trolley car 42 which moves back and forth over slightly arcuate trolley rails 43, the center of said rails 43 being a greater distance from said brush arm 28 than its ends. The trolley rails 43 are supported from brush arms 28 by trolley rail supports 44. Trolley car 42 includes an upper roller 45 under which cable 40 passes, and a lower roller 46 which rolls underneath trolley rails 43. Trolley 42 moves back and forth over the length of the length of trolley rails 43 when brush arms 28 pivot, such that the moment arm extending from the brush arms bearings 28 to trolley car 22 varies with the orientation of brush arms 28. As brush arms 28 pivot upwardly towards a more horizontal position, trolley car 42 is pulled toward the brush by cable 40, thereby increasing the moment arm. On the other hand, when brush arms 28 pivot downwardly to approach the generally vertical position trolley 42 is pulled by cable 40 towards the bearings 27, thereby decreasing the moment arm. This variable moment arm allows brushes 29 to exert a nearly constant washing pressure whereby wash results are improved.

Upper and lower side brushes 47 and 48 are disposed on each side of frame 11 to wash the vehicle's sides. Upper side brush 47 has a greater diameter than lower side brush 48 so that the upper portions of a vehicle, which are generally narrower than the lower parts, will be adequately washed. Both of these brushes rotate on brush axle 49 mounted on side brush arms 50. Side brush arms 50 are mounted to the top and bottom ends of support tube 51, which is canted towards the interior of the wash bay at its top end. Each end of the support tubes 51 are pivotally secured to frame 11 by hinges 52 and 53. The upper hinges 52 are secured to a frame extension members 54, projecting from the top member 20 of each side frame assembly. The lower hinges are secured to the bottom member 19.

Pneumatic cylinders 55 actuate to pull the side brushes away from the center of the wash area 14 to allow room for a vehicle to enter and leave the wash bay 14. When a wash cycle begins, pneumatic cylinders 55 are deactivated thereby allowing side brushes 47 and 48 to fall towards the center of wash area 14 by the force of gravity against the sides of the vehicle. Side brushes 47 and 48 are each independently driven by a motor 56 through gear boxes 57 attached at the top or bottom end, respectively, of each side brush. This independent drive system allows each side brush to be controlled separately. During the course of a wash cycle, upper side brushes 47 stop rotating when the machine is washing the forward parts of the vehicle, as seen in FIGS. 6C, 6D, and 6E. This is done to avoid damaging a vehicle radio antenna.

Protective vehicle guide rails 58 are placed along the sides of vehicle wash bay 14 to prevent a vehicle from entering the wash bay too far to the left or right. Guide rails 58 are necessary to prevent the wash machine or vehicle from damage. Protective guide rails 58 also aid a driver to properly center the vehicle within the wash bay to ensure good wash results. However, as an additional aid, a pair of water jets 15 are located directly above the center of the vehicle area 14. The water jets 15 produce a stream of water projecting directly downward so that a driver can align the center of his vehicle within the vehicle wash area. The car is centered in the wash area 14 when the water beam strikes the center of the vehicle's hood. This additional feature thus affords an easy means for a driver to precisely position a vehicle at the center of the wash area 14 to obtain optimum wash results.

Figure 7:
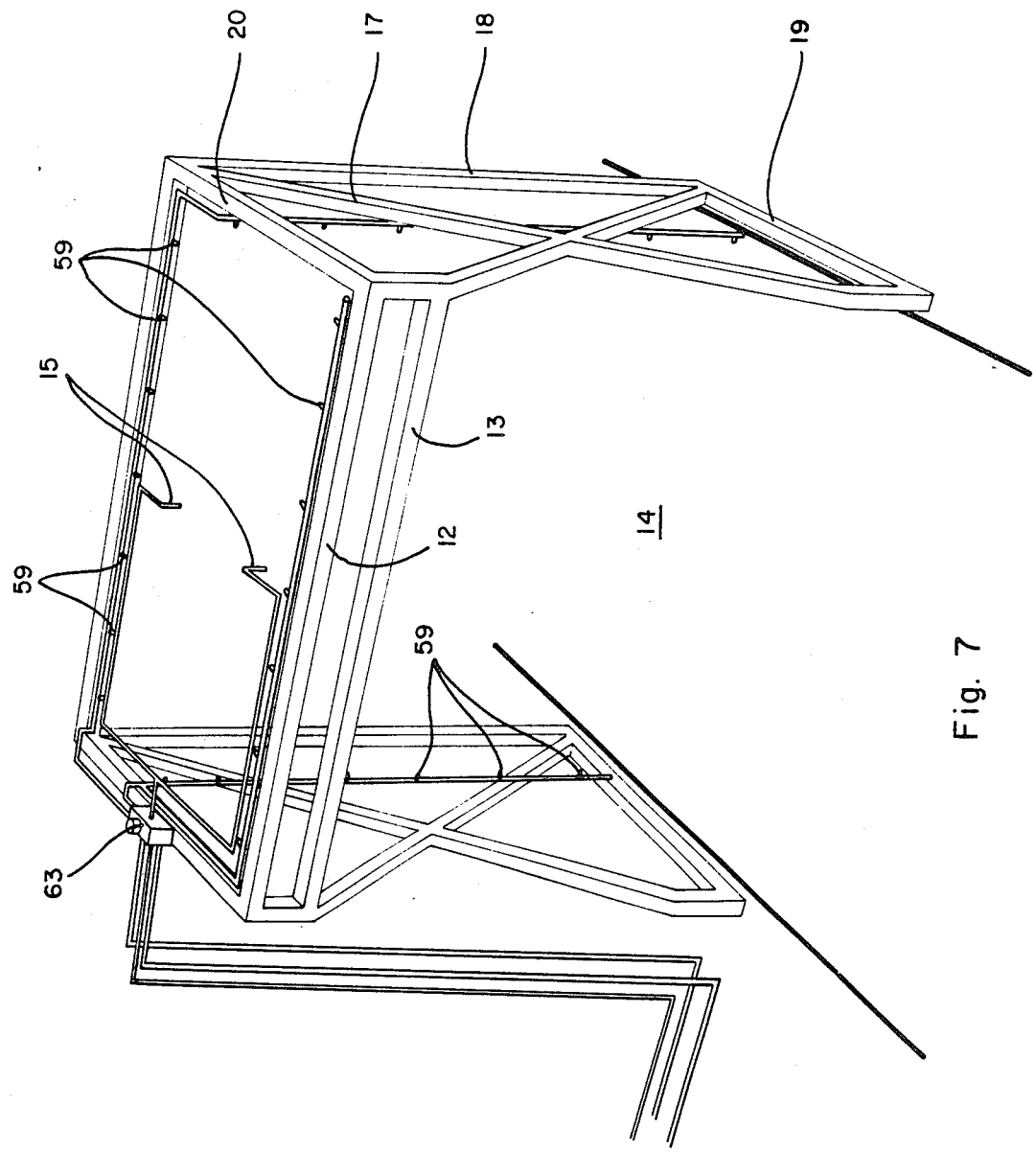

Soapy water and rinse water are alternately sprayed onto the wash brushes by jets 59 which are controlled by solenoids 63. These sprayers 59 are mounted on frame 11 and keep the brushes continually wet with soapy liquid so that they will move smoothly over a vehicle surface. The sprayers 59 may consist of a series of perforated tubes disposed on opposite sides and above the vehicle wash area as shown in FIG. 7. The particular arrangement, however, is not an essential part of the invention.

Control unit 60 is connected by cable 61 to control the operation of the unit. Control unit 60 contains electronic gear to direct the wash sequence by switching on and off the electric motors 31 and 56, jets 15 and 59, and pneumatic cylinders 33 and 55. When all of these various parts of the machine are sequentially engaged, the washing machine will pass through the washing sequence shown in FIG. 6 to wash a vehicle.

FIG. 6A shows the washing machine at the beginning of the wash sequence with the horizontal brushes raised to their upper positions to allow a vehicle to enter the wash bay. As seen in FIG. 6B, upon initiation of the wash sequence, the front horizontal brush lowers onto the vehicle to clean its hood and the side brushes fall towards the interior of the wash bay to clean the vehicle's sides.

Over the course of a wash sequence, the entire frame 11 of the vehicle washing machine is driven forward and backward along frame rails by drive wheels 24. The frame first moves forward, as shown in FIGS. 6C and 6D, to clean the front hood, grille, bumper, and fenders of the vehicle. The upper side brushes stop rotating during this segment of the wash sequence to avoid damaging an antenna or the front fender of the vehicle.

The rearward horizontal brush also lowers to wash the vehicle as shown in FIG. 6D. Both brushes remain lowered through the remainder of the wash sequence to quickly cover the surface of the vehicle and thereby speed the wash process. FIG. 6E shows the vehicle washing machine frame as it begins to move towards the rear of the vehicle. As the machine moves further backwards the upper side brushes resume their rotation, as seen in FIG. 6F, to wash the upper side portions of the vehicle.

Figure 6G:
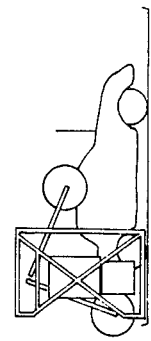
Figure 6B:
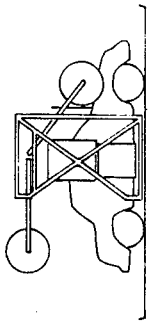
Figure 6F:
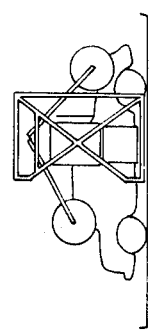
Figure 6A:
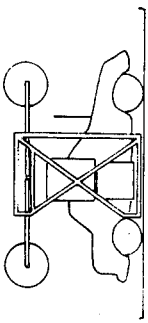
Figure 6E:
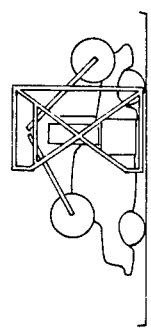

The machine washes the rear of the vehicle as it moves to the aftermost end of the wash bay as shown in FIG. 6G. Since the horizontal brushes are pivotably suspended the rear horizontal brush rotates downward to wash the rear bumper.

Upon completion of the wash sequence the frame moves back over the center of the wash bay and the brushes are lifted or pulled away from the vehicle by the pneumatic cylinders. The machine thus assumes the position of Figure 6H to permit the newly cleaned vehicle to leave the wash bay. The machine is also positioned to accept another vehicle for washing.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A machine for washing a vehicle comprising: a frame proximate a washing area; at least one brush with a substantially horizontal axis of rotation; a pair of brush arms pivotally secured at one end to said frame and carrying said brush between the ends of said brush arms opposite said pivot end; a trolley movably mounted to at least one of said brush arms; a cable engaging said trolley; a torsion spring assembly for tensioning said cable to apply a lifting force to said brush arm through said trolley which tends to rotate said brush arm away from said vehicle; wherein said trolley moves along said brush arm away from its pivoted end as said brush arm rotates from its lowermost positon to its uppermost position; and wherein said trolley moves along said brush arm towards its pivoted end as said brush arm rotates from its uppermost position to its lowermost position.

2. The vehicle washing machine of claim 1 further including a pair of said brushes pivotally mounted to said frame on opposite sides of said vehicle washing area so as to swing towards and away from said vehicle washing area, said side brushes having a substantially vertical axis of rotation canted slightly toward said vehicle washing area so that said side brushes are pulled toward said vehicle washing area by the force of gravity.

3. A machine for automatically washing vehicles disposed within a vehicle washing area comprising:
 a frame proximate a washing area;
 a brush for scrubbing said vehicle;
 at least one brush arm pivotally connected at one end to the frame and supporting the brush at its opposite end, the brush arm being pivotal about a substantially horizontal axis between an uppermost position in which the brush arm extends horizontally and the brush is raised above the vehicle wash area, and a lowermost position in which the brush arm extends vertically and the brush is disposed within the vehicle wash area, the brush arm being urged to the lowermost position by gravitational force;
 and counter balance means connected to the brush arm at a movable connection point disposed between the pivoted end and the brush end for applying a force to the brush arm tending to rotate the same from the lowermost position to the uppermost position, the counterbalance means including means for moving the connection point as the brush arm rotates so as to increase the distance between the connection point and the pivoted end as the brush rotates from its lowermost position to its uppermost position.

4. The vehicle washing machine of claim 3 wherein said counterbalance means includes a cable for applying a lifting force to said brush arm and a means for tensioning said cable.

5. The vehicle washing machine according to claim 4 wherein said tensioning means includes a torsion spring assembly having a springshaft rotatably mounted to the frame, a shieve secured to the spring shaft, and a torsion spring for biasing the shieve in one direction, wherein the cable is wound about the shieve.

6. The vehicle washing machine of claim 3 wherein the means for moving the connection point includes a trolley mounted on the brush arm and movable along the length thereof between the pivoted end and the brush end.

7. The vehicle washing machine according to claim 3 wherein the means for moving the connection point includes a guidebar secured to the frame between the pivoted end and the brush end, and a trolley engaged with and movable along the guidebar.

* * * * *